(12) United States Patent
Nagasawa

(10) Patent No.: US 6,315,277 B1
(45) Date of Patent: Nov. 13, 2001

(54) FLUID-FILLED ACTIVE VIBRATION DAMPING DEVICE INCLUDING OSCILLATING MEMBER OSCILLATED BY ACTUATOR CONTROLLED WITH PULSE SIGNAL

(75) Inventor: Masahiko Nagasawa, Kani (JP)

(73) Assignee: Tokai Rubber Industries, Ltd., Komoki (JP)

( * ) Notice: Subject to any disclaimer, the term of this patent is extended or adjusted under 35 U.S.C. 154(b) by 0 days.

(21) Appl. No.: 09/260,170

(22) Filed: Mar. 1, 1999

(30) Foreign Application Priority Data

Mar. 4, 1998 (JP) .................................................. 10-051774

(51) Int. Cl.$^7$ ...................................................... F16F 13/00
(52) U.S. Cl. ....................................................... 267/140.14
(58) Field of Search ........................... 267/140.14, 140.15

(56) References Cited

U.S. PATENT DOCUMENTS

| | | | |
|---|---|---|---|
| 4,583,723 | * 4/1986 | Ozawa | 267/140.14 |
| 4,638,983 | * 1/1987 | Idigkeit et al. | 267/140.14 |
| 5,180,148 | 1/1993 | Muramatsu . | |
| 5,246,212 | 9/1993 | Funahashi et al. . | |
| 5,333,846 | * 8/1994 | Goto et al. | 267/140.14 |
| 5,346,192 | * 9/1994 | Weltin et al. | 267/140.14 |
| 5,427,347 | * 6/1995 | Swanson et al. | 248/550 |
| 5,779,731 | * 7/1998 | Okazaki et al. | 267/140.14 |
| 6,105,943 | * 8/2000 | Nagasawa | 267/140.14 |

FOREIGN PATENT DOCUMENTS

| | | |
|---|---|---|
| 61-191543 | 11/1986 | (JP) . |
| 06-010986 A | 1/1994 | (JP) . |
| 06-300077 A | 10/1994 | (JP) . |
| 07-119789 A | 5/1995 | (JP) . |
| 8-72561 | 3/1996 | (JP) . |
| 2510914 | 4/1996 | (JP) . |
| 2510915 | 4/1996 | (JP) . |
| 9-42374 | 2/1997 | (JP) . |

* cited by examiner

Primary Examiner—Matthew C. Graham
(74) Attorney, Agent, or Firm—Burr & Brown

(57) ABSTRACT

A fluid-filled active vibration damping device for actively damping a vibration of a desired object, wherein an elastically deformable elastic body and an oscillating body partially define a fluid chamber filled with a non-compressible fluid, and the oscillating body is elastically supported by an elastic support member such that the oscillating body is oscillatable by an actuator, so as to control a pressure of the non-compressible fluid in the fluid chamber, and wherein a control device controls the actuator by applying thereto a pulse signal whose frequency corresponds to a frequency of the vibration of the desired object, and the oscillating body has a natural frequency fa which satisfies an inequality, $(1/\sqrt{2})F<fa<2F$.

18 Claims, 5 Drawing Sheets

FLUID-FILLED ACTIVE VIBRATION DAMPING DEVICE INCLUDING OSCILLATING MEMBER OSCILLATED BY ACTUATOR CONTROLLED WITH PULSE SIGNAL

This application is based on Japanese Patent Application No. 10-51774 filed Mar. 4, 1998, the content of which is incorporated hereinto by reference.

BACKGROUND OF THE INVENTION

1. Field of the Invention

The present invention relates in general to a fluid-filled active vibration damping device adapted to regulate the pressure of a non-compressible fluid in a fluid chamber formed therein, for applying an oscillating force to an object whose vibration is to be damped, in order to actively damp the vibration of the object. More particularly, this invention is concerned with such a fluid-filled active vibration damping device suitably used as an engine mount or a vibration damper for automotive vehicles.

2. Discussion of the Prior Art

For damping a vibration (including a noise due to the vibration) of an object to be damped, such as the body or other members of automotive vehicles which are subject to a vibration, there have been various vibration damping devices such as a vibration damping connector and a vibration damper. The vibration damping connector, such as an engine mount, is interposed between a vibration source and an object whose vibration is to be damped, in order to damp the vibration to be transmitted from the vibration source to the object. The vibration damper, such as a dynamic damper, is attached directly to the object to absorb or damp the vibration of the object.

To meet a need for improved vibration damping characteristics, there has been proposed a fluid-filled active vibration damping device, as an example of such a vibration damping device as described above, as disclosed in JP-U-61-191543, JP-B2-2510914 and JP-B2-2510915. Such a fluid-filled active vibration damping device includes an elastic body which partially defines a fluid chamber filled with a non-compressible fluid and which is elastically deformable by a vibrational load received from an object whose vibration is to be damped. The active vibration damping device further includes an oscillating body which also partially defines the fluid chamber and which is displaceable or deformable, and an actuator or drive means for oscillating the oscillating body. The oscillation of the oscillating body is controlled by applying to the drive means an electric signal corresponding to a characteristic of the vibration of the object, to thereby control the pressure of the fluid in the fluid chamber, so as to generate a controlled oscillating force to be applied to the oscillating body, so that the vibration of the object is actively or positively damped.

For such an active vibration damping device to be able to provide a sufficiently high vibration damping effect, it is desirable that the waveform of the oscillating force to be applied to the oscillating body, that is, the waveform of the fluid pressure change in the fluid chamber correspond to the characteristics of the vibration of the object to be damped. Where the vibration source is an internal combustion engine of an automotive vehicle, for instance, it is considered possible to apply an oscillating force to the oscillating body by energizing the drive means for generating an electromagnetic force or pneumatic force, with an electric current having a sine wave whose period, amplitude and phase correspond to those of the waveform of the vibration of the object, as disclosed in JP-A-8-72561 and JP-A-9-42374.

However, controlling the electric current so as to have a sine wave corresponding to the waveform of the vibration of the object requires an expensive control device with a complicated control arrangement, and tends to suffer from deterioration of the vibration damping effect due to a control delay associated with a high-frequency control of the drive means with an electric control signal. In particular, the drive means adapted to generate a pneumatic force by energization with a sine wave drive current is not necessarily capable of generating an effective oscillating force, since it is extremely difficult to regulate the pneumatic force whose magnitude varies along a sine wave, even if the control device can be arranged to generate the sine wave drive current as the electric control signal.

For solving the drawback indicated above, it is considered possible, for example, to use an electric pulse signal as the electric control signal for controlling the drive means. Where the active vibration damping device is used as an engine mount for an automotive vehicle, for instance, the electric control signal in the form of pulses whose frequency corresponds to that of the vibration of the object to be damped can be relatively easily obtained on the basis of a crank angle signal or an ignition timing signal of an engine of the vehicle. Further, the phase angle of the electric control pulse signal can be easily controlled by a central processing unit having a comparatively small processing capacity, and the magnitude of the generated oscillating force can be suitably adjusted by controlling the electric level control, duty ratio control or pulse width modulation (PWM) of the pulse signal.

An extensive study by the present inventors regarding the control of the drive means with an electric control pulse signal revealed that the use of the pulse signal for controlling the drive means is likely to cause undesired generation of higher harmonic components of the vibration frequency of the object, in the waveform of the fluid pressure change in the fluid chamber which takes place by oscillation of the oscillating body, and therefore in the waveform of the oscillating force to be applied to the object, not only where the drive means is adapted to generate a pneumatic force, but also where the drive means is adapted to generate an electromagnetic force or where the drive means uses a strictive element or elements. Thus, the use of the electric control signal in the form of pulses for energizing the drive means does not permit the active vibration damping device to exhibit a desired vibration damping effect, in the presence of the higher harmonics in the waveform of the oscillating force to be generated. Further, the use of the electric control pulse signal may even have a risk of deteriorating the vibrating condition of the object. Therefore, the use of the electric control pulse signal for the drive means still has a technical problem to be solved.

SUMMARY OF THE INVENTION

It is therefore an object of the present invention to provide a fluid-filled active vibration damping device which includes drive means suitably controllable by an electric control pulse signal, to generate an oscillating force for actively damping the vibration of the object, while minimizing the generation of higher harmonic components of the vibration frequency of the object.

The above object may be accomplished according to the principle of the present invention, which provides a fluid-filled active vibration damping device for actively damping a vibration of a desired object, comprising: (a) an elastic body which is elastically deformable by the vibration of the desired object and which partially defines a fluid chamber filled with a non-compressible fluid; (b) an oscillating body which partially defines the fluid chamber; (c) an elastic support member which elastically supports the oscillating body such that the oscillating body is displaceable; (d) an actuator for oscillating the oscillating body, so as to control a pressure of the non-compressible fluid in the fluid chamber; (e) a control device for controlling the actuator by applying thereto a pulse signal whose frequency corresponds to a frequency F of the vibration of the desired object; and (f) the oscillating body having a natural frequency fa satisfying an inequality, $(1/\sqrt{2})F<fa<2F$.

In the fluid-filled active vibration damping device of the present invention constructed as described above, the pulse signal whose frequency corresponds to the frequency of the vibration of the desired object to be damped is applied directly to the actuator, for oscillating the oscillating body at a frequency corresponding to the frequency of the pulse signal, so that the fluid pressure in the fluid chamber is periodically changed, to apply an oscillating force based on this fluid pressure change to the desired object. The oscillating body, which converts a drive force generated by the actuator into the periodic fluid pressure change in the fluid chamber, is elastically supported by the elastic support member, such that a spring system consisting of the elastic support member and a mass system including the oscillating body constitute a vibration system. It will be understood from well known resonance characteristics of a vibration system that the amplitude of oscillation of the oscillating body is relatively large owing to a resonance action of the mass-spring systems, when the oscillating body is oscillated at a frequency near the natural frequency of the vibration system. Accordingly, the drive force generated by the actuator is efficiently transmitted by oscillation of the oscillating body to the fluid chamber, so as to effectively induce the periodic change of the fluid pressure in the fluid chamber, and generate an oscillating force to be applied to the desired object, for thereby actively damping the vibration of the object. When the oscillating body is oscillated at a frequency which is considerably different from the natural frequency of the vibration system, in particular, at a frequency considerably higher than the natural frequency of the vibration system, the efficiency of transmission of the drive force of the actuator to the oscillating body, and the efficiency of conversion of the oscillation of the oscillating body into the fluid pressure change in the fluid pressure are sufficiently lowered, so that the amount of the fluid pressure change and the oscillating force are considerably reduced.

In the present active damping device wherein the natural frequency fa of the vibration system including the oscillating body satisfies the inequality $(1/\sqrt{2})F<fa<2F$, the oscillating body can be oscillated with a sufficiently large amplitude, and a sufficiently large oscillating force is generated based on the periodic change of the fluid pressure in the fluid chamber, providing a high active damping effect with respect to the vibration of the desired object, by oscillating the oscillating body at a frequency almost equal or near the frequency of the vibration of the desired object, even if the oscillating force generated by the actuator for oscillating the oscillating body includes higher harmonic frequency components. However, the amplitude of oscillation of the oscillating body and the oscillating force generated by the fluid pressure change are restricted at the higher harmonic frequencies, so that the deterioration of the vibration of the desired object due to the higher harmonic frequency components is effectively reduced or prevented.

Thus, the present fluid-filled active vibration damping device wherein the adverse influence of the higher harmonic components on the oscillating force is significantly reduced is capable of exhibiting a high active damping effect with respect to the vibration of the desired object. Further, the application of the pulse signal to the actuator permits easy control of the actuator, and is effective to prevent deterioration of the active vibration damping characteristic due to a control delay, assuring increased stability of the active vibration damping effect. Unlike a control device using a sine wave signal for controlling the actuator for oscillating the oscillating body, the control device using the pulse signal according to the present invention can be simplified in control arrangement and is available at a relatively low cost.

The present fluid-filled active vibration damping device includes a vibration damping structure having at least the elastic body, oscillating body and elastic support member. Where the vibration damping structure is used as an engine mount or a body mount for an automotive vehicle, for instance, the vibration damping structure is interposed between a vibration source such as the vehicle engine and the desired object such as the vehicle body whose vibration is to be damped by the present vibration damping device. In this case, the vibration source and the desired object are connected to each other in a vibration damping manner. Alternatively, one of the vibration source and the desired object is mounted on the other in a vibration damping manner. Further, the vibration damping structure may be used as a vibration damper, which is attached to the desired object whose vibration is to be actively damped by the present active vibration damping device.

The elastic support member for elastically supporting the oscillating body is preferably a rubber or elastic member or a metallic spring such as a sheet spring. For providing an improved active vibration damping effect with the oscillating body being oscillated to generate an oscillating force having a sine waveform, it desirable to form the elastic support member of a rubber or elastic material providing a high damping effect. Although the oscillating body may be formed of a hard material such as a metal or a resin, the oscillating body and the elastic support member may be formed of an elastic material such as a rubber as an integral body. In this case, the single integral elastic body serves as the oscillating body as well as the elastic support member. Namely, the peripheral portion of this elastic integral body serves as the elastic support member while the central portion serves as the oscillating body.

Preferably, the actuator used in the present fluid-filled active vibration damping device may be an electrically operated drive means for converting an electric energy into an oscillating force for oscillating the oscillating body, according to an electric control signal. This electrically operated drive means may be an electromagnetic drive means such as a voice coil type, a moving magnet type or a solenoid-operated type, for generating an electromagnetic force for oscillating the oscillating body. Alternatively, the electrically operated drive means may use a strictive element or elements such as an electrostrictive or magnetostrictive element or elements. Further, the actuator may be a fluid-actuated drive means for generating an oscillating force for oscillating the oscillating body, by controlling a pneumatic or hydraulic pressure with a servo valve according to an electric control signal. Alternatively, the actuator may be a pneumatically drive means including an air chamber and a solenoid-operated switch valve which is alternately switched between two positions according to an electric control signal, for alternately applying the atmospheric pressure and a negative pressure to the air chamber, so as to produce an oscillating force for oscillating, the oscillating body. Where the pneumatically operated drive means including the air chamber is used, the oscillating body may be formed so as to partially define the air chamber, so that a periodic change of the pressure in the air chamber acts on the oscillating body, so as to oscillate the oscillating body.

The pulse signal generated by the control device may be digital ON/OFF pulses for applying an electric current to the actuator in one direction, or pulse signals having opposite polarities for applying an electric current to the actuator in opposite directions. Similarly, the actuator may be adapted to generate a force acting on the oscillating body in one direction, or a force acting on the oscillating body in opposite directions depending upon the polarity of the pulse signal. Generally, the control means is adapted to shape the waveform of the pulse signal to be applied to the actuator, depending upon the characteristics of the vibration of the desired object to be damped, so that an effective oscillating force is applied to the desired object, for actively damping the vibration of the desired object. For instance, the control means incorporates frequency adjusting means for controlling the frequency of the pulse signal depending upon the frequency of the vibration of the desired object, phase adjusting means for controlling the phase of the pulse signal depending upon the vibrating condition or transfer function of the desired object, and gain adjusting means for adjusting the amplitude of the pulse signal so that the magnitude of the oscillating force corresponds to the amplitude of the vibration of the desired object. The gain adjusting means may be adapted to adjust the amplitude (voltage value) of the pulse signal, or the duty ratio of the pulse signal, or alternatively adapted to effect pulse width modulation (PWM) of the pulse signal.

In the present fluid-filled active vibration damping device, the natural frequency fa of the oscillating body is interpreted to mean the natural frequency after the present active vibration damping device has been installed in connection with the desired object. The natural frequency fa should be determined by taking account of the spring stiffness of the elastic body partially defining the fluid chamber, and the amount of initial rise of the fluid pressure in the fluid chamber, which initial rise is caused by an initial static load acting on the elastic body upon installation of the damping device. The spring stiffness of the elastic body and the initial fluid pressure rise influence the oscillating body which also partially defines the fluid chamber. It is also noted that the frequency F is the frequency of a major component of the vibration of the desired object, which is to be actively damped by the present damping device. In other words, the vibration of the desired object may have a plurality of components having different frequencies, which includes the major component, or alternatively the frequency of the major component may change over a certain relatively narrow range.

According to the present invention, the natural frequency fa of the oscillating body should be determined to satisfy the inequality, $(1/\sqrt{2})F<fa<2F$. However, the natural frequency fa is preferably determined so as to satisfy a formula $fa \leq 1.8F$, and more preferably determined so as to satisfy a formula $F \leq fa \leq (\sqrt{2})F$, for effectively preventing the generation of a second-order harmonic component (2F) of the frequency F, while assuring a sufficiently high active vibration damping effect with respect to the frequency F. Where the frequency of the major component of the vibration of the desired object changes between a minimum value $F_L$ and a maximum value $F_H$, for example, the natural frequency fa of the oscillating body is preferably determined 50 as to satisfy a formula $(1/\sqrt{2})F_L<fa<2F_H$, and more preferably determined so as to satisfy a formula $(1/\sqrt{2})F_L<fa<2F_L$, According to a preferred form of this invention, the fluid chamber a primary chamber in which the pressure of the non-compressible fluid is changed when the elastic body is elastically deformed, and an auxiliary chamber in which the pressure of the non-compressible fluid is changed when the oscillating member is oscillated, and the fluid-filled active vibration damping device further comprises means for defining a first orifice for fluid communication between the primary and auxiliary chambers, the first orifice being formed such that a resonance frequency fb of the non-compressible fluid flowing through the first orifice corresponds to the frequency F of the vibration of the desired object, and is not higher than the resonance frequency fa of the oscillating body.

In the above-indicated preferred form of the invention, the pressure of the non-compressible fluid in the auxiliary chamber is periodically changed by oscillation of the oscillating body by the actuator, so that the fluid is forced to flow through the first orifice between the primary and auxiliary chambers, on the basis of a difference between the fluid pressures in the primary and auxiliary chambers, whereby the periodic fluid pressure change is transmitted from the auxiliary chamber to the primary chamber. As a result, the periodic fluid pressure change in the primary chamber causes an oscillating force to be applied to the desired object, so as to actively damp the vibration of the desired object. The resonance frequency fb of the non-compressible fluid flowing through the first orifice is determined by the length and the cross sectional area of the first orifice, the viscosity and specific gravity of the non-compressible fluid, and the spring stiffness values of the primary and auxiliary chambers. At this resonance frequency fb, the amount of flow of the fluid through the first orifice is considerably large owing to the resonance of the fluid. At a frequency considerably different from the resonance frequency fb, in particular, at a frequency considerably higher than the resonance frequency fb, the resistance to flow of the fluid through the first orifice tends to be extremely increased. Therefore, since the resonance frequency fb of the fluid flowing through the first orifice corresponds to the frequency F of the major component of the vibration of the desired object, the fluid pressure change can be efficiently transmitted from the auxiliary chamber to the primary chamber, so as to provide a high vibration damping effect with respect to the vibration of the desired object, when the oscillating body is oscillated at a frequency almost equal or close to the frequency F. Further, since the fluid resonance frequency fb of the first orifice is not higher than the resonance frequency fa of the oscillating body, the fluid flow resistance of the first orifice is sufficiently high at a higher harmonic component of the frequency F, so that the transmission of the fluid pressure change of the higher harmonic component from the auxiliary chamber to the primary chamber is effectively restricted, even if the higher harmonic component is more or less included in the waveform of oscillation of the oscillating body by the actuator. Accordingly, the higher harmonic component is effectively filtered out from the oscillating force applied to the desired object.

According to another preferred form of this invention, the fluid-filled active vibration damping device further comprises a flexible diaphragm which partially defines an equilibrium chamber filled with a non-compressible fluid, and means for defining a second orifice for fluid communication between the equilibrium chamber and the fluid chamber, and wherein the second orifice is formed such that a resonance frequency fc of the non-compressible fluid flowing through the second orifice is lower than the frequency F of the vibration of the desired object.

In the above-indicated preferred form of the active vibration damping device, the fluid is forced to flow from the fluid chamber into the equilibrium chamber when an initial static load acts on the elastic body upon installation of the damping device. Accordingly, the volume of the equilibrium chamber is increased, preventing a rise of the fluid pressure in the fluid chamber due to the initial static load, so that the pressure of the fluid in the fluid chamber can be easily and effectively controlled by controlling the oscillation of the oscillating body. Thus, the provision of the equilibrium chamber assures increased stability of the active vibration damping effect provided by the instant damping device. In addition, the overall vibration damping effect of the damping device can be improved by utilizing the resonance of the fluid flowing through the second orifice. Since the fluid resonance frequency fc of the second orifice is tuned to be lower than the frequency F of the vibration to be damped by oscillation of the oscillating body, the components of the input vibration whose frequencies are lower than the natural frequency of the oscillating body and which are less likely to be efficiently damped by the oscillating force based on the fluid pressure change in the fluid chamber can be efficiently damped based on the resonance of the fluid flowing through the second orifice, so that the instant damping device provides an improved overall vibration damping effect over a relatively wide range of frequency of the input vibration. Where the second orifice is provided in addition to the first orifice for fluid communication between the primary and auxiliary chambers, as described above, the second orifice is tuned to exhibit a high damping effect with respect to the vibration whose frequency is lower than the frequency to which the first orifice is tuned to provide a high damping effect based on the resonance of the fluid flowing therethrough. At the tuned frequency of the first orifice, the fluid flow resistance of the second orifice is extremely high, as if the second orifice is substantially closed. Accordingly, the second orifice does not adversely influence the fluid flows through the first orifice, and therefore permits the damping device to provide a high damping effect based on the fluid flows through the first orifice.

According to a further preferred form of this invention, the fluid-filled active vibration damping device further comprises a first mounting member and a second mounting member which are elastically connected to each other by the elastic body, and the oscillating body is elastically supported by the second mounting member through the elastic support member. In this form of the invention, the actuator includes drive means for oscillating the oscillating body, and the drive means is supported by the second mounting member, while one of the first and second mounting members is fixed to the desired object.

The fluid-filled active vibration damping device constructed as described above is comparatively simple in construction. The present damping device can be suitably used as an elastic mount, such as an engine mount, for connecting two members to each other in a vibration damping manner. One of these two members is the vibration source while the other member is the desired object whose vibration is to be damped. Where the present damping device is used an a vehicle engine mount, for example, the first mounting member is attached to the engine or power unit (vibration source) of an automotive vehicle, while the second mounting member is attached to the vehicle body (desired object whose vibration is to be damped). Further, the present damping device may be used as a vibration damper, by attaching one of the first and second mounting members to the desired object, and by elastically supporting the other of these two mounting members on the desired object through the elastic body such that the elastic body and the above-indicated other mounting member constitute a vibration system.

BRIEF DESCRIPTION OF THE DRAWINGS

The above and other objects, features and advantages of the present invention will be better understood by reading the following detailed description of presently referred embodiments of the invention, when considered in connection with the accompanying drawings, in which.

DETAILED DESCRIPTION OF THE PREFERRED EMBODIMENT

Figure 1:
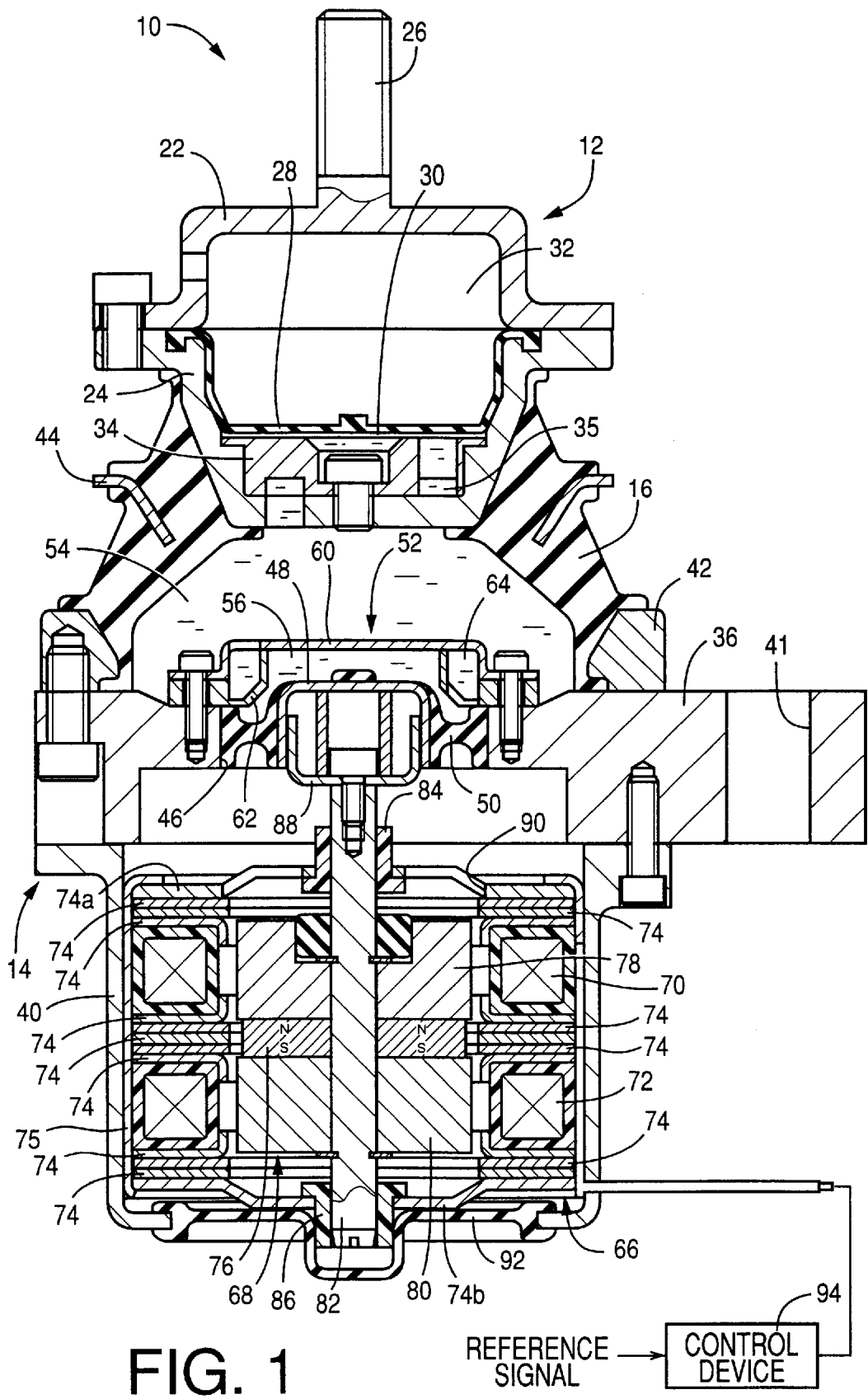
FIG. 1 is an elevational view in axial cross section of a fluid-filled active vibration damping device in the form of an engine mount of an automotive vehicle, which is constructed according to one embodiment of this invention.

Referring first to FIG. 1, the engine mount 10 shown therein is a fluid-filled active vibration damping device constructed according to a first embodiment of this invention. This engine mount 10 is used on an automotive vehicle, for mounting a power unit on the body of the vehicle in a vibration damping manner. The engine mount 10 includes a first mounting member 12 and a second mounting member 14 which are made of metallic materials and are elastically connected to each other by an elastic body 16 such that the first and second mounting members 12, 14 are spaced apart from each other by a suitable distance in a vertical direction as seen in FIG. 1. When the present engine mount 10 is installed on the vehicle, the first mounting member 12 is fixed to the power unit of the vehicle which includes an engine, while the second mounting member 14 is fixed to the vehicle body, so that the power unit is mounted on the vehicle body via the engine mount 10. The power unit is a vibration source, while the vehicle body is an object whose vibration is to be damped by the present engine mount 10.

With the engine mount 10 installed on the vehicle, the weight of the power unit acts on the elastic body 16, so that the elastic body 16 is elastically compressed in the vertical direction, and the first and second mounting members 12, 14 are displaced toward each other by a given distance. In this condition, a primary vibrational load to be damped acts on the engine mount 10 in the vertical direction in which the first and second mounting members 12, 14 are opposed to each other.

The first mounting member 12 is a hollow structure consisting of an upper member 22 and a lower member 24 which are both substantially cup-shaped. These upper and lower members 22, 24 are butted and bolted together at their open ends so as to define an interior space. The upper member 22 has a mounting screw 26 extending upwards from its bottom wall. The first mounting member 12 is fixed at its mounting screw 26 to the power unit of the vehicle.

Within the interior space of the first mounting member 12, there is disposed a cup-shaped flexible diaphragm 28 which is a relatively thin, easily displaceable or deformable film. The flexible diaphragm 28 is gripped at its peripheral portion by and between the butted flanges of the upper and lower members 22, 24. The interior space of the first mounting member 12 is fluid-tightly divided by the flexible diaphragm 28 into two sections on the opposite sides of the flexible diaphragm 28. Described more specifically, the flexible diaphragm 28 cooperates with the lower member 24 to define an equilibrium chamber 30 which is filled with a non-compressible fluid and the volume of which is easily variable. The flexible diaphragm 28 cooperates with the upper member 22 to define an air chamber 32 which communicates with the atmosphere and permits the flexible diaphragm 28 to be displaced. The non-compressible fluid may be water, alkylene glycol, polyalkylene glycol or silicone oil. For the engine mount 10 to provide an improved vibration damping effect, the non-compressible fluid desirably has a viscosity not higher than 0.1 Pa·s.

The first mounting member 12 also accommodates an orifice member 34 in the form of a circular disc superposed on and bolted to the bottom wall of the lower member 24. The orifice member 34 cooperates with the lower member 24 to define a fluid passage 35 serving as a second orifice. The fluid passage 35 is formed so as to extend in the circumferential direction of the disc-like orifice member 34, over a circumferential length corresponding to an angle slightly smaller than 360°. The fluid passage 35 communicates at one end thereof with the equilibrium fluid chamber 30, and is open at the other end in the lower surface of the bottom wall of the lower member 24.

On the other hand, the second mounting member 14 consists of a substantially cylindrical support member 36 made of a metallic material and having a center hole 46, and a cup-shaped casing 40 which is bolted at its open end to the underside of the support member 36. The support member 36 has a plurality of mounting bolt holes 41 formed through a radially outer portion thereof, so that the second mounting member 14 is fixed to the vehicle body by bolts inserted through the mounting bolt holes 41.

The second mounting member 14 is disposed below the first mounting member 12 with a suitable distance therebetween, and is elastically connected to the first mounting member 12 by the elastic body 16 interposed therebetween. The elastic body 16 is a relatively thick-walled hollow truncated conical member having an upper open end portion with a relatively small diameter and a lower open end portion with a relatively large diameter. In the process of vulcanization of a rubber material for forming the elastic body 16, the upper open end portion of the elastic body 16 is bonded at its inner circumferential surface to the outer circumferential surface of the lower member 24 of the first mounting member 12, while the lower open end portion of the elastic body 16 is bonded at its outer circumferential surface to the inner circumferential surface of a connecting ring 42 which is made of a metallic material. The connecting ring 42 is bolted to the upper portion of the support member 36 of the second mounting member 14, whereby the elastic body 16 is fixed at its large-diameter end to the second mounting member 14. Thus, the first and second mounting members 12, 14 are elastically connected to each other by the elastic body 16. To assure increased stability of elastic deformation of the elastic body 16 and prevent buckling thereof, a rigid restrictor ring 44 is embedded in an axially intermediate portion of the elastic body 16.

In a radially central portion of the center hole 46 of the support member 36 of the second mounting member 14, there is disposed an inverted cup-shaped oscillating body 48 having a diameter considerably smaller than that of the center hole 46. The oscillating body 48 is made of a hard material such as a metal or synthetic resin, and is supported by an annular elastic support 50, which is bonded at its inner and outer circumferential surfaces to the outer circumferential surface of the oscillating member 48 and the inner circumferential surface of the center hole 46, respectively, in the process of vulcanization of a rubber material to form the elastic support 50. Thus, the oscillating body 48 is supported by the support member 36 through the elastic support 50 such that the center hole 46 formed through the support member 36 is fluid-tightly closed by the oscillating member 48 and the elastic support 50, and such that elastic deformation of the elastic support 50 permits the oscillating member 48 to be displaced and oscillated in the vertical direction. When an external force does not act on the oscillating member 48 and the elastic support 50, the oscillating member 48 is held by the elastic support 50, in its original or neutral position in which the elastic support 50 has substantially no internal strain. After the oscillating member 48 is displaced from the original position by an external force applied thereto, the oscillating member 48 is returned to the original position by an elastic force of the elastic support 50 when the external force is removed.

The oscillating member 48 and the elastic support 50 cooperate with the first and second mounting members 12, 14 and the elastic body 16 to define a fluid-tight enclosure, which is divided by a partition member 52 into two sections. The partition member 52 is a circular structure which generally extends in the radial direction and which is bolted at its peripheral portion to the upper surface of the support member 36 such that the partition member 52 is spaced from the oscillating body 48 and the elastic support 50 in the axial direction. Thus, the partition member 52 divides the above-indicated fluid-tight enclosure into a primary fluid chamber 54 partially defined by the elastic body 16, and an auxiliary fluid chamber 56 partially defined by the oscillating body 48. Like the equilibrium fluid chamber 30, these primary and auxiliary fluid chambers 54, 56 are filled with the non-compressible fluid described above. Upon application of a vibrational load between the first and second mounting members 12, 14, the elastic body 16 is elastically deformed, and the pressure of the fluid in the primary fluid chamber 54 changes. On the other hand, the pressure of the fluid in the auxiliary fluid chamber 56 changes when the oscillating body 48 is displaced or oscillated, as described below in detail. Thus, the primary and auxiliary fluid chambers 54, 56 are formed on the opposite sides of the partition member 52. The equilibrium, primary and auxiliary fluid chambers 30, 54, 56 may be filled with the non-compressible fluid, by assembling the engine mount 10 within a mass of the non-compressible fluid contained in a suitable vessel. The engine mount 10 is assembled by bolting the second mounting member 14 at its support member 36 to an intermediate assembly consisting of the elastic body 16 and the first mounting member 12 and connector ring 42 that are bonded to the elastic body 16.

The partition member 52 consists of an inverted cup-shaped upper member 60 having a relatively small depth, and a generally cylindrical orifice member 62 which is disposed in the radially outer portion of the interior of the upper member 60 and bolted thereto such that the upper member 60 and the orifice member 62 cooperate to define a fluid passage 64 serving as a first orifice for fluid communication between the primary and secondary fluid chambers 54, 56. The upper member 60 and the orifice member are formed of metallic materials. The fluid passage 64 extends in the circumferential direction of the partition member 52, over a suitable circumferential length. As indicated above, the fluid passage 35 serves as the second orifice for fluid communication between the equilibrium fluid chamber 30 and the primary fluid chamber 54.

The fluid passages 35, 64 are suitably tuned depending upon frequency bands of the vibrations desired to be damped. Namely, the length and cross sectional area of fluid flow of each of the fluid passages 35, 64 are determined while taking account of the spring stiffness values associated with the equilibrium, primary and auxiliary fluid chambers 30, 54, 56 and the viscosity of the non-compressible fluid, so that the resonance frequency of the fluid flowing through the fluid passage 35, that is, a frequency fc of a vibration that can be effectively damped by resonance of the fluid flowing through the fluid passage 35 is lower than the resonance frequency of the fluid flowing through the fluid passage 64, that is, a frequency fb of a vibration that can be effectively damped by resonance of the fluid flowing through the fluid passage 64. The "spring stiffness values" means an amount of change of the fluid pressure in the appropriate fluid chamber required to cause a unit amount of change of the volume of the fluid chamber. For instance, the fluid passage 64 is tuned to permit the engine mount 10 to exhibit a sufficiently reduced absolute value of spring constant, namely, a sufficiently high vibration isolating effect, with respect to an engine idling vibration of about 25 Hz, based on the resonance of the fluid flowing through the fluid passage 64, while the fluid passage 35 is tuned to permit the engine mount 10 to exhibit a sufficiently high vibration damping effect, with respect to an engine shaking vibration of about 10 Hz, based on the resonance of the fluid flowing through the fluid passage 35.

The cup-shaped casing 40 of the second mounting member 14 accommodates an electromagnetic actuator or drive means for oscillating the oscillating body 48. This electromagnetic actuator consists of an annular coil assembly 66 and a magnet assembly 68 disposed in a central space within the annular coil assembly 66. The magnet assembly 68 is movable relative to the coil assembly 66 in the axial direction. Upon energization of the coil assembly 66, an electromagnetic force is generated between the coil assembly 66 and the magnet assembly 68, and the magnet assembly 68 is moved by the electromagnetic force, for displacing the oscillating member 48 in the axial direction (in the vertical direction as seen in FIG. 1).

Described in detail, the coil assembly 66 includes a first coil 70 and a second coil 72 disposed coaxially with each other, and three stacks of ferromagnetic rings 74 made of a ferromagnetic material. One of the three stacks of ferromagnetic rings 74 is interposed between and fixed to the first and second coils 70, 72, and the other two stacks are disposed at and fixed to the opposite axial ends of the coil assembly 66. Thus, the coil assembly 66 is an annular structure. The coil assembly 66 is fixedly fitted in a metal sleeve 75 having a relatively large diameter, and the metal sleeve 75 is press-fitted in the cup-shaped casing 40, 50 that the coil assembly 66 is fixed to the second mounting member 14 through the casing 40.

On the other hand, the magnet assembly 68 consists of an annular permanent magnet 76 made of a known material for a permanent magnet, and an upper and a lower annular ferromagnetic block 78, 80 made of a ferromagnetic material and disposed on the axially opposite sides of the permanent magnet 76. The annular permanent magnet 76 and ferromagnetic blocks 78, 80 which are superposed on each other have respective center bores through which a rod 82 is inserted such that the permanent magnet 76 and the ferromagnetic blocks 78, 80 are fixed to an axially intermediate portion of the rod 82. The permanent magnetic 76 has opposite magnetic poles at its axially opposite ends, as indicated in FIG. 1. The magnetic assembly 68 which is a stack of the permanent magnet 76 and the ferromagnetic blocks 78, 80 has an outside diameter slightly smaller than the inside diameter of the annular coil assembly 66, and has an axial length smaller than that of the coil assembly 66. The magnet assembly 68 is disposed within the coil assembly 66 in a substantially coaxial or concentric relationship with the coil assembly 66, such that the magnet assembly 68 is axially movable with the rod 82, relative to the coil assembly 66.

The rod 82 fixed to the magnet assembly 68 projects from the coil assembly 66 in the opposite axial directions, extending through an upper and a lower slide bushing 84, 86 fixed to the respective uppermost and lowermost ferromagnetic rings 74a, 74b of the coil assembly 66, so that the rod 82 is slidably guided by the slide bushings 84, 86 in the axial directional. A cup-shaped connector 88 is bolted to the upper end portion of the rod 82, and is press-fitted in the oscillating body 48, so that the magnetic assembly 68 with the rod 82 is displaceable with the oscillating body 48. Further, the oscillating body 48 is guided by the rod 82 in the axial direction through the slide bushings 84, 86. To prevent the air within the cup-shaped casing 40 from providing an adverse spring effect on the axial displacement of the magnet assembly 68, the uppermost ferromagnetic ring 74a having the upper slide bushing 84 for guiding the rod 82 has an air breather aperture 90, and a portion of the bottom wall of the cup-shaped casing 40 consists of a rubber diaphragm 92 which is easily deformable.

In the engine mount 10 constructed as described above, energization of the coils 70, 72 of the coil assembly 66 with an electric current will cause the coil assembly 66 to be polarized in the axial direction, generating an electromagnetic force attracting or repelling the magnet assembly 68, or a Lorentz force in a magnetic field of the magnet assembly 68 to which the coils 70, 72 is exposed. As a result, a drive force acts on the coil assembly 66 and the magnetic assembly 68 so as to move these assemblies 66, 68 relative to each other in the axial direction, so that the movably disposed magnet assembly 68 is moved with the rod 82, so as to move the oscillating body 48 in the upward or downward direction with elastic deformation of the elastic support 50. The electric current to be applied to the coils 70, 72 is controlled according to a current signal in the form of pulses generated from a control device 94. When the electric current is removed from the coils 70, 72, the oscillating body 48 and the magnet assembly 68 are returned to their original positions by the elastic force of the elastic support 50. Therefore, the oscillating body 48 is oscillated by energizing the coils 70, 72 according to the current control pulse signal.

With the coils 70, 72 repeatedly energized with the electric current according to the pulse signal from the control device 94, the oscillating body 48 is oscillated by the electromagnetic force or Lorentz force and the elastic force of the elastic support 50 which elastically supports the oscillating body 48. As a result, the fluid pressure in the auxiliary fluid changer 56 is periodically alternately increased and lowered at a frequency and an amplitude which correspond to the frequency and amplitude of oscillation of the oscillating body 48, so that the fluid is forced to flow through the fluid passage 64 between the primary and auxiliary fluid chambers 54, 56, in response to the fluid pressure change in the auxiliary fluid chamber 56 relative to the fluid pressure in the primary fluid chamber 54. Accordingly, the periodic fluid pressure change in the auxiliary fluid chamber 56 is transmitted to the primary fluid chamber 54, so that an oscillating force corresponding to the periodic fluid pressure change induced in the primary fluid chamber 54 is transmitted to the vehicle body through the first and second mounting members 12, 14. Therefore, by oscillating the oscillating body 48 at a frequency and an amplitude corresponding to those of the vibration of the vehicle body to be damped (object whose vibration is to be damped), the vibration of the vehicle body arising from the vibration of the power unit (vibration source) can be actively damped by the corresponding oscillating force based on the periodic fluid pressure change induced in the auxiliary and primary fluid chambers 56, 54.

The electric current to be applied to the coils 70, 72 from the control device 94 is controlled so that the frequency and amplitude of the oscillating force to be transmitted to the vehicle body by oscillation of the oscillating body 48 correspond to those of the vibration to be damped, while the phase of the oscillating force is opposite to that of the vibration to be damped. Explained more particularly, the control device 94 determines the frequency of the current control pulse signal for intermittently applying an electric current to the coils 70, 72, on the basis of a reference signal representative of the characteristics of the vibration of the vehicle body. The reference signal may be an output signal of an acceleration sensor for detecting the vibration of the vehicle body, or a crank angle signal or ignition timing signal of the vehicle engine, which signal has a correlation with the characteristics of the vehicle body vibration. The phase and amplitude of the current control pulse signal are determined on the basis of a suitable parameter such as the speed of the engine, the acceleration of the vehicle, the selected operating position of a transmission of the vehicle, and the temperature, and according to predetermined relationships between the parameter and the phase and between the parameter and the amplitude. The predetermined relationships are obtained by experiments and represented by data maps stored in a memory in the control device 94.

The present engine mount 10 wherein an oscillating force generated by the electromagnetic drive device 66, 68, 82 is transmitted to the auxiliary fluid chamber 56 through the oscillating body 48 has a vibration system consisting of a mass system and a spring system. The mass system consists of the oscillating member 48 and the magnet assembly 68 with the rod 82, while the spring system consists of the elastic support 50 through which the mass system is elastically supported by the support member 36. A natural frequency fa of this vibration system is set to satisfy an inequality, $(1/\sqrt{2})F<fa<2\,F$, by suitably adjusting the mass of the mass system and the modulus of elasticity of the spring system. In the above inequality, "F" represents a frequency F of the vibration to be damped by application of the oscillating force to the vehicle body.

In the present engine mount 10, the natural frequency fa of the vibration system is determined to be substantially equal to the resonance frequency fb of the fluid flowing through the fluid passage 64. That is, the frequency fb at which the engine mount 10 exhibits a sufficiently low dynamic spring constant based on the resonance of the fluid flowing through the fluid passage 64, and the natural frequency fa of the vibration system including the oscillating body 48 are both set to be about 25 Hz, which is a typical frequency of the engine idling frequency.

In the arrangement indicated above, therefore, the amplitude of oscillation of the oscillating body 48 by the electromagnetic actuator can be effectively increased, when the oscillating body 48 is oscillated at the natural frequency of the vibration system which includes the oscillating body 48. When the oscillating body 48 is oscillated at a frequency higher than the natural frequency of the vibration system, the efficiency of transmission of the oscillating force from the electromagnetic actuator to the oscillating body 48 is considerably lowered, causing a decrease in the amplitude of oscillation of the oscillating body 48. Accordingly, even if the waveform of the oscillating force transmitted from the electromagnetic actuator to the oscillating body 48 includes higher harmonic components of the natural frequency of the vibration system (that is, higher harmonic components of the frequency of the vibration to be damped), the present arrangement is effective to reduce higher harmonic components included in the oscillation of the oscillating body 48, and in the periodic fluid pressure change in the auxiliary fluid chamber 56 caused by the oscillation of the oscillating body 48, and the higher harmonic components included in the periodic fluid pressure change in the primary fluid chamber 54 caused by the periodic fluid pressure change in the auxiliary fluid chamber 56, and in the oscillating force to be applied to the vehicle body based on the periodic fluid pressure change in the primary fluid chamber 54. Consequently, the present engine mount 10 exhibits a high overall active vibration damping effect with respect to the vibration of the vehicle body, while effectively avoiding deterioration of the vibration of the vehicle body due to the higher harmonic components. In this respect, it is noted that the use of the elastic support 50 for elastically supporting the comparatively hard oscillating body 48 and the function of the rod 82 to guide the oscillating body 48 in the oscillating direction permit the vibration system to have a single natural frequency and exhibit stable resonance characteristics, while effectively minimizing adverse influences of the higher harmonic components.

In the present engine mount 10, the fluid passage 64 through which the periodic fluid pressure change in the auxiliary fluid chamber 56 that is caused by oscillation of the oscillating body 48 is transmitted to the primary fluid chamber 54 is tuned to provide a high vibration damping effect with respect to a vibration whose frequency is almost equal or close to the natural frequency of the above-indicated vibration system which includes the oscillating body 48. Accordingly, the resonance of the fluid flowing through the fluid passage 64 provides a high filtering effect with respect to the higher harmonic components that would otherwise be included in the periodic fluid pressure change which is transmitted from the auxiliary fluid chamber 56 to the primary fluid chamber 54. Described more specifically, the amount of the fluid which is forced to flow through the fluid passage 64 is considerably increased by the resonance of the fluid when the oscillating body 48 is oscillated at a frequency near the tuned frequency of the fluid passage 64 (the natural frequency of the vibration system). When the oscillating body 48 is oscillated at a frequency higher than the tuned frequency, the resistance to flow of the fluid flow through the fluid passage 64 is increased, and the fluid is not likely to flow through the fluid passage 64. Thus, the periodic fluid pressure change in the auxiliary fluid chamber 56 which is caused by oscillation of the oscillating body 48 at the frequency almost equal or close to the tuned frequency is effectively transmitted to the primary fluid chamber 54, so as to generate a large oscillating force to be applied to the vehicle body, for actively damping its vibration. However, when the frequency of oscillation of the oscillating body 48 is higher than the tuned frequency of the fluid passage 64, the periodic fluid pressure change caused by the oscillation of the oscillating body 48 is less likely to be transmitted from the auxiliary fluid chamber 56 to the primary fluid chamber 54, so as to effectively prevent the higher harmonic components included in the oscillating force to be applied to the vehicle body.

In addition, the present engine mount 10 is adapted to control the electromagnetic actuator 66, 68, 82 according to the electric current control signal in the form of pulses, so that the oscillating force to be applied to the oscillating body 48 and to the vehicle body can be easily and precisely controlled, assuring improved vibration damping characteristics and increased vibration damping stability. Further, the present engine mount 10 does not require the control device 94 to have a high processing capacity, and the control device 94 is available at an accordingly reduced cost.

Figure 2:
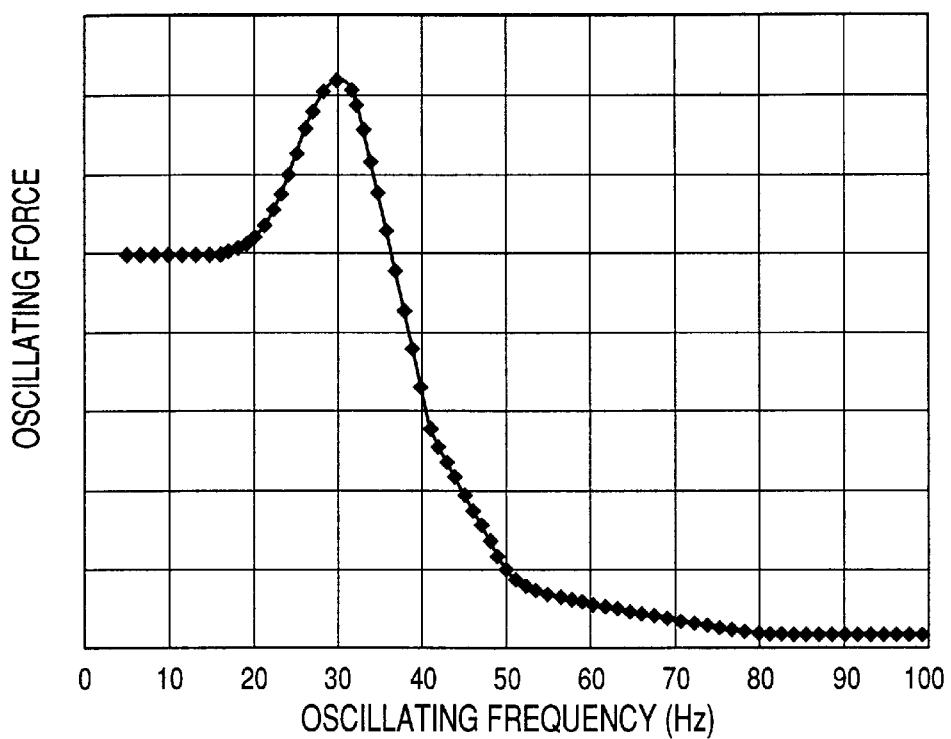
FIG. 2 is a graph showing a resonance curve indicative of a measured oscillating force generated when an oscillating body is oscillated at different frequency values, where the resonance frequency of a vibration system including the oscillating body is tuned to 30 Hz, in the engine mount of FIG. 1.
Figure 3:
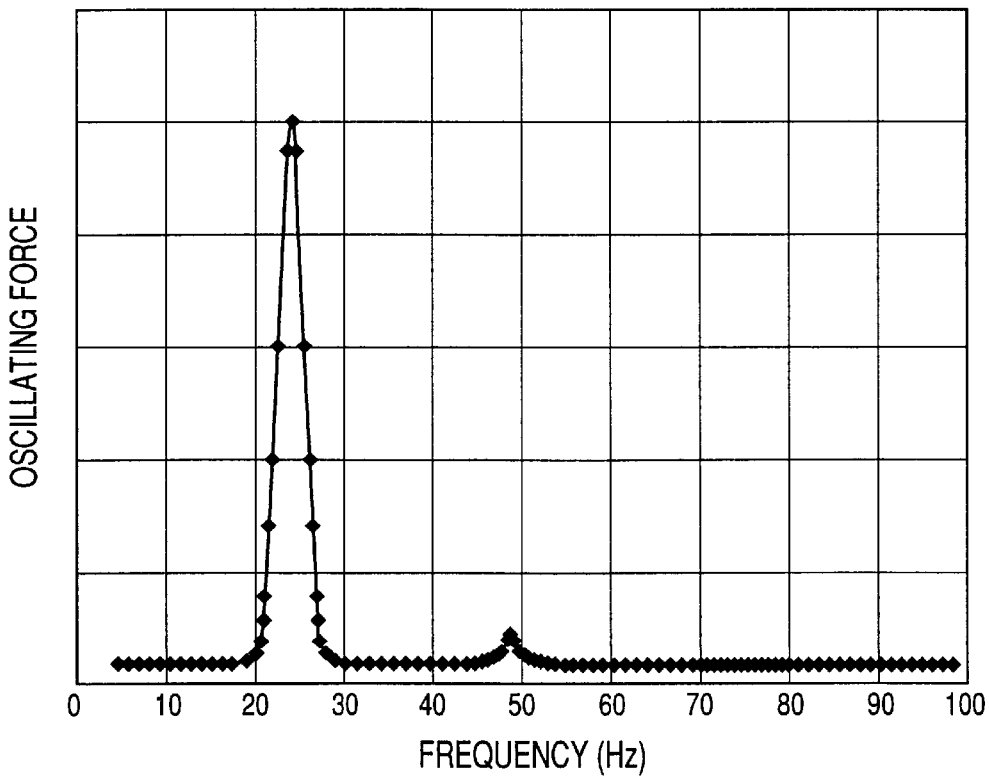
FIG. 3 is a graph indicating a measured distribution of the frequency of the oscillating force generated in the engine mount having the resonance curve of FIG. 2, when the oscillating body is oscillated with drive means controlled by an electric control pulse signal of 25 Hz.
Figure 4:
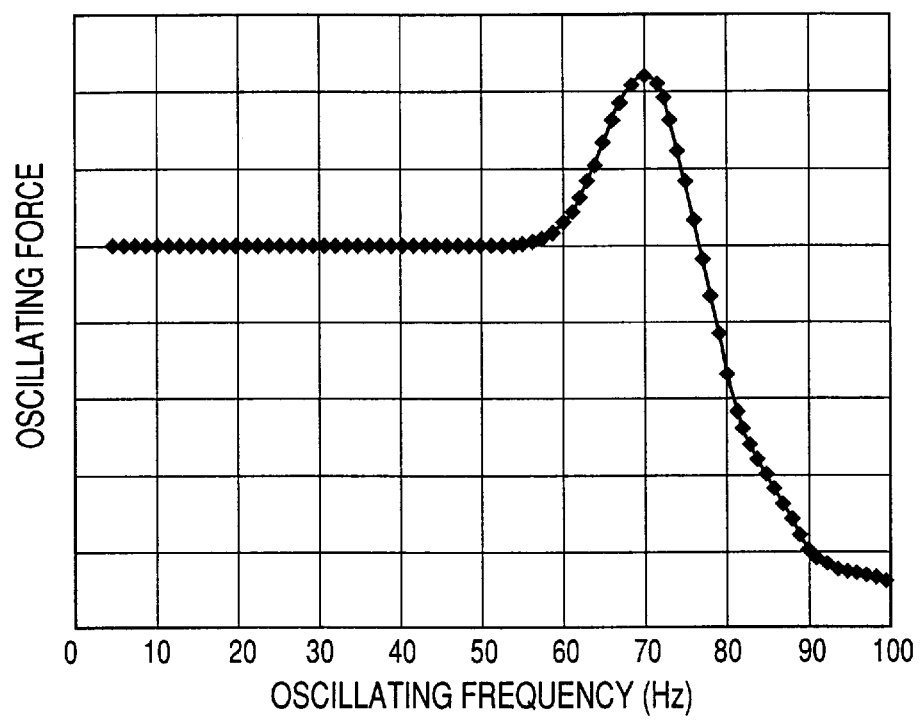
FIG. 4 is a graph showing a resonance curve indicative of a measured oscillating force generated when the oscillating body is oscillated at different frequency values, in a comparative example of the engine mount of FIG. 1 wherein the resonance frequency of the vibration system including the oscillating body is tuned to 70 Hz.
Figure 5:
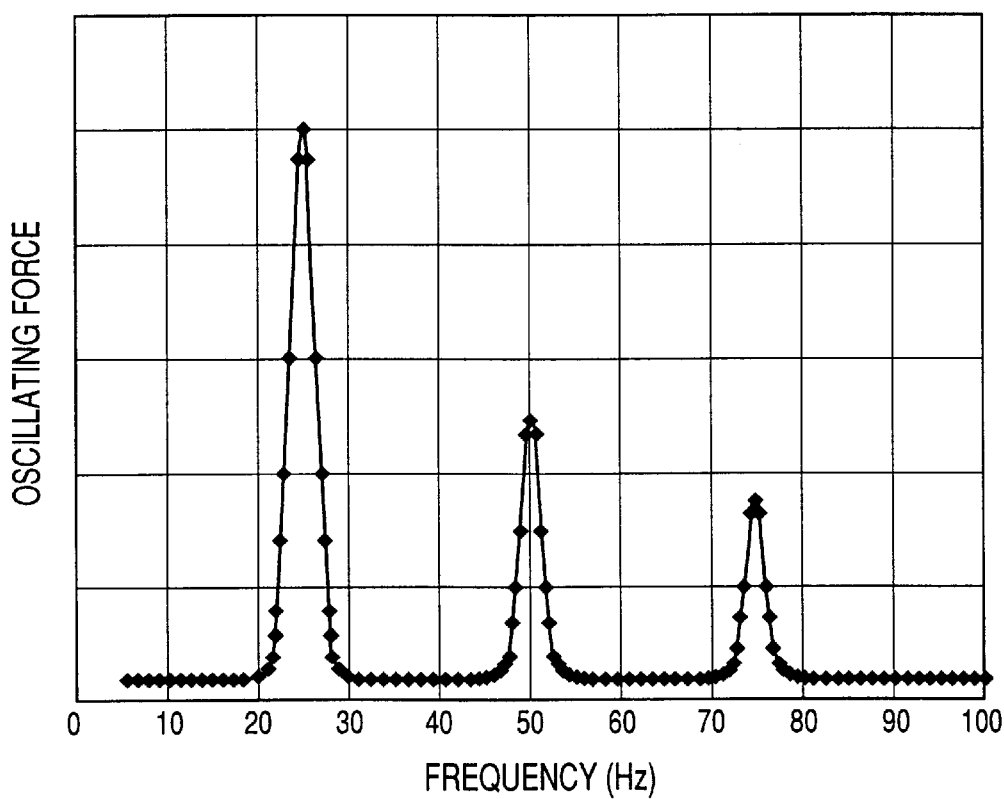
FIG. 5 is a graph indicating a measured distribution of the frequency of the oscillating force which is generated in the comparative engine mount having the resonance curve of FIG. 4, when the oscillating body is oscillated with the drive means controlled by an electric control pulse signal 25 Hz.

An experiment was conducted on a specimen of the engine mount 10 of FIG. 1 according to the principle of the present invention, and a comparative specimen of the engine mount 10. These specimens are arranged to provide a high active damping effect with respect to an engine idling vibration F of 25 Hz. In the specimen according to the present invention, the vibration system including the oscillating body 48 and the elastic support 50 has a natural frequency fa of 30 Hz, which is the same as the tuned frequency fb of the fluid passage 64. In the comparative specimen, the natural frequency fa of the vibration system and the tuned frequency fb of the fluid passage 64 are both set to be 70 Hz. That is, fa=fb$\geq$2 F. The graph of FIG. 2 shows a resonance curve indicative of a measured oscillating force generated in the specimen according to the invention when the oscillating body 48 was oscillated at different frequency values. The graph of FIG. 3 shows a measured distribution of the oscillating force generated when the oscillating body 48 was oscillated by energizing the coils 70, 72 with a current control pulse signal of 25 Hz. The graph of FIG. 4 shows a resonance curve indicative of a measured oscillating force generated in the comparative specimen when the oscillating body 48 was oscillated at different frequency values. The graph of FIG. 5 shows a measured distribution of the oscillating force generated when the oscillating body 48 was oscillated by energizing the coils 70, 72 with the current control pulse signal of 25 Hz.

It will be understood from the graphs of FIGS. 2–5 that the engine mount 10 of FIGS. 2 and 3 according to the present invention wherein the fluid passage 64 is tuned to 30 Hz and the vibration system including the oscillating body 48 and the elastic support 50 has the resonance frequency of 30 Hz provides a sufficiently large oscillating force when the oscillating body 48 is oscillated at the frequency (25 Hz) of the vibration (engine idling vibration) that should be damped. Further, unlike the oscillating force generated in the comparative engine mount of FIGS. 4 and 5, the oscillating force generated in the engine mount according to the invention does not include higher harmonic components, namely, 50 Hz, 75 Hz, etc. which are multiples of the fundamental frequency of 25 Hz that should be damped.

Figure 6:
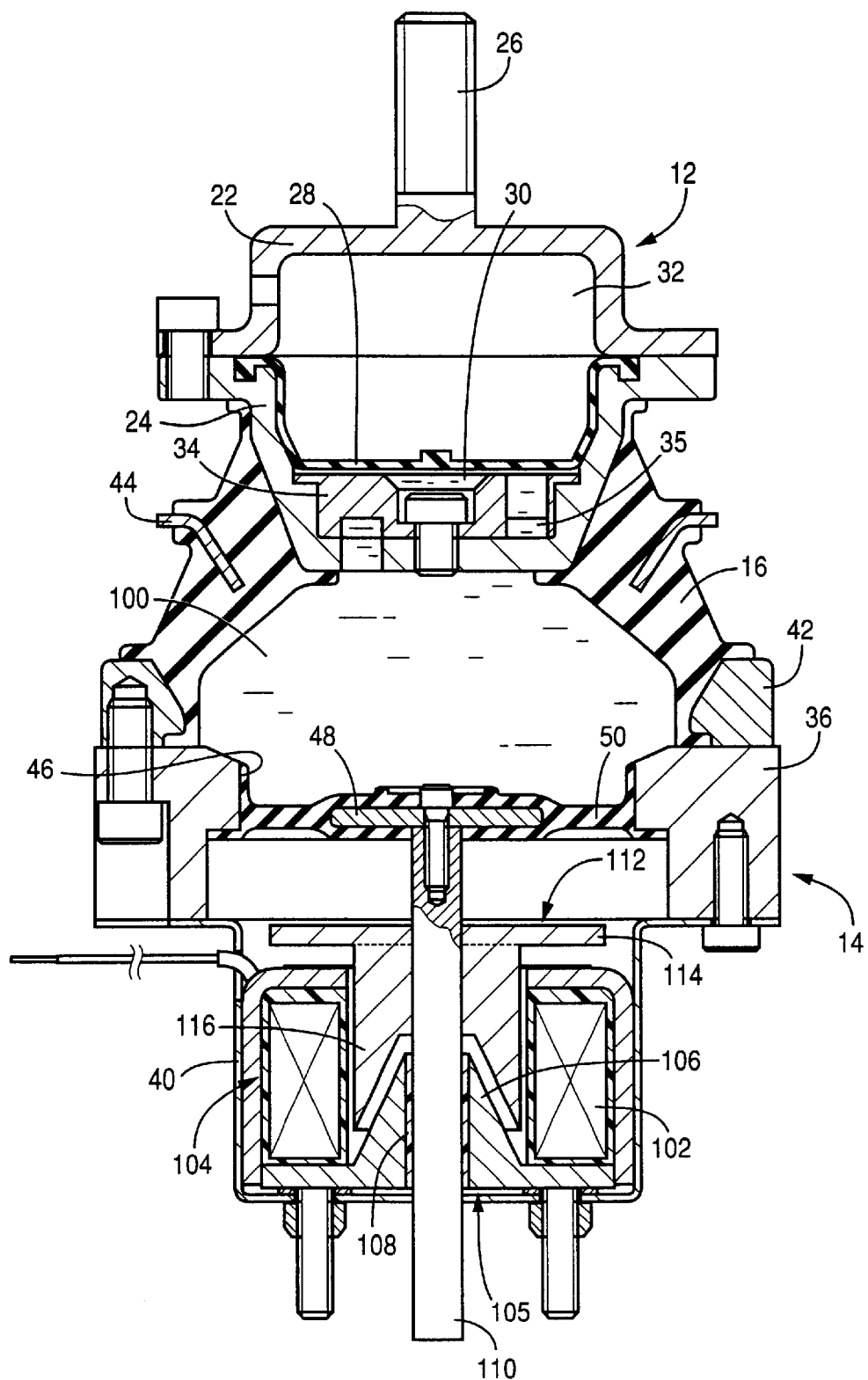
FIG. 6 is an elevational view in axial cross section of an engine mount of an automotive vehicle, which is constructed according to a second embodiment of this invention.

Referring next to FIG. 6, there will be described an engine mount constructed according to a second embodiment of this invention. In the second embodiment of FIG. 6, the same reference numerals as used in the first embodiment of FIG. 1 will be used to identify the elements which are the same as or similar to those in the first embodiment. No redundant description of these elements will be provided, in the interest of simplification of the description.

The engine mount according to the second embodiment is not provided with the partition member 52 which divides the fluid-tight enclosure into the primary and auxiliary fluid chambers and which has the fluid passage serving as an orifice. That is, the first and second mounting members 12, 14 and the elastic body 16 cooperate with the oscillating member 48 and the elastic support 50 to define a single fluid chamber 100.

Further, the electromagnetic actuator or drive means for oscillating the oscillating body 48 accommodated in the casing 40 of the second mounting member 14 is different in construction from that used in the first embodiment. Namely, the electromagnetic actuator uses a single coil 102, and two ferromagnetic yoke members 104, 105 fixed to the coil 102 such that the outer circumferential surface and the opposite annular upper and lower axial end faces are covered by the yoke members 104, 105. The yoke member 105 is secured by bolts to the bottom wall of the casing 40, for fixing the coil 102 to the casing 40. The yoke member 105 includes an integrally formed tapered guide portion 106 extending upwards into a center bore of the coil 102. The guide portion 106 has a slide bushing 108 through which a rod 110 bolted to the oscillating body 48 is inserted, so that the rod 110 is slidably guided by the slide bushing 108 in the axial direction. On an axially intermediate portion of the rod 110, there is fixedly mounted an electromagnetically movable member 112 made of a ferromagnetic material. This movable member 112 consists of an annular plate portion 114 and a cylindrical portion 116 which extends downwards from a central part of the annular plate portion 114. The annular plate portion 114 is located above the yoke member 104, so that a radially outer part of the annular plate portion 114 is opposed to the annular upper end face of the yoke member 104. The cylindrical portion 116 has a lower end part which is normally located within the center bore of the coil 102 and above the slide portion 106 of the yoke member 105.

In the electromagnetic actuator constructed as described above, the yoke members 104, 105 are magnetized upon energization of the coil 102, and generates an electromagnetic force which attracts the movable member 112 downwards, so that the oscillating body 48 is displaced downwards through the rod 110 against an elastic force of the elastic support 50. When the coil 102 is de-energized, the oscillating body 48 and the movable member 112 are returned to the original position. Therefore, by intermittently energizing the coil 102 with an electric current applied thereto according to a current control pulse signal, the oscillating body 48 is oscillated so as to cause a periodic change of the fluid pressure in the fluid chamber 100, so that an oscillating force based on this periodic fluid pressure change is applied between the first and second mounting members 12, 14. Thus, the present engine mount provides an active vibration damping effect, by controlling the current control pulse signal depending upon the vibration to be damped.

The engine mount constructed as described above also has a vibration system consisting of a mass system consisting of the oscillating member 48, rod 110 and movable member 112, and a spring system consisting of the elastic support 50. The oscillating force generated by the electromagnetic actuator 102, 104, 105, 110, 112 is transmitted to the oscillating body 48 through this vibration system. The natural frequency fa of the present vibration system is set to satisfy the inequality, $(1/\sqrt{2})F<fa<2\ F$, by suitably adjusting the mass of the mass system and the modulus of elasticity of the spring system. In the above inequality, "F" represents a frequency F of the vibration to be damped by application of the oscillating force to the vehicle body. This arrangement is effective to provide a sufficiently large oscillating force at the fundamental frequency, that is, at the frequency of the vibration that should be damped, while reducing higher harmonic frequency components included in the oscillation of the oscillating body 48 by the electromagnetic actuator, in the periodic fluid pressure change in the fluid chamber 100 caused by the oscillation of the oscillating body 48, and in the oscillating force to be applied to the vehicle body based on the periodic fluid pressure change in the fluid chamber 100.

Thus, like the engine mount of the first embodiment, the engine mount of the present second embodiment exhibits a high overall active vibration damping effect with respect to the vibration of the vehicle body, by controlling the electromagnetic actuator with the current control pulse signal, while effectively avoiding deterioration of the vibration of the vehicle body due to the higher harmonic components.

Figure 7:
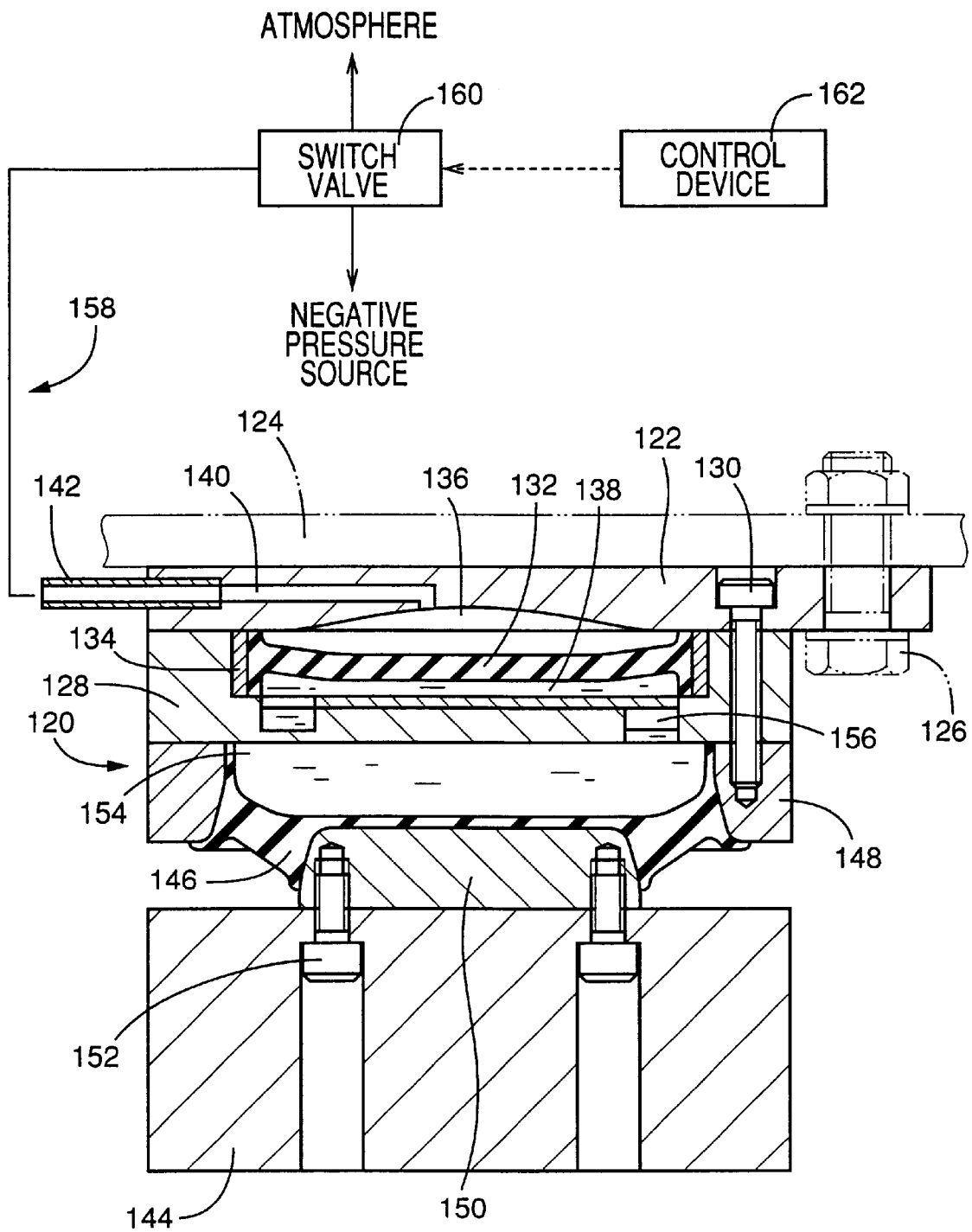
FIG. 7 is an elevational view in axial cross section of a fluid-filled active vibration damping device in the form of a vibration damper constructed according to a third embodiment of the invention.

Reference is now made to FIG. 7 showing a third embodiment of the present invention in the form of an active vibration damper 120 including a mounting plate 122 serving as the first mounting member. When the vibration damper 120 is installed on an automotive vehicle, the mounting plate 122 is attached by bolts 126 to a vibratile member 124 such as the body of the vehicle, which is an object whose vibration is to be damped. On the underside of the mounting plate 122, there is superposed a cup-shaped partition member 128 made of a metallic material and having a relatively small depth. The partition member 128 is fixed to the mounting plate 122 by screws 130. The opening of the partition member 128 is fluid-tightly closed by the mounting plate 122, so that the partition member 128 cooperates with the mounting plate 122 to define a fluid-tight enclosure therebetween. A circular rubber plate 132 with a metal ring 134 bonded to its outer circumferential surface is accommodated in this fluid-tight enclosure, so as to extend in the radial direction. The rubber plate 132 is fixed in the fluid-tight enclosure with the metal ring 134 held in pressing contact with the inner circumferential surface of the cup-shaped partition member 128, such that the rubber plate 132 divides the fluid-tight enclosure into two sections. That is, the rubber plate 132 cooperates with the mounting plate 122 to define an air chamber 136, and cooperates with the bottom wall of the partition member 128 to define an auxiliary fluid chamber 138 filled with a non-compressible fluid. The mounting plate 122 has an air passage 140 which communicates at one end thereof with the air chamber 136, and is connected at the other end to an external air conduit 158 through a connector 142, so that the air pressure in the air chamber 136 is periodically changed, as described below in detail. A periodic change of the air pressure in the air chamber causes an oscillation of the rubber plate 132, which in turn causes a periodic change of the fluid pressure in the auxiliary fluid chamber 138.

A cylindrical metallic mass member 144 serving as the second mounting member is disposed below the partition member 128 and elastically connected to the partition member 128 through an elastic body 146. Thus, the mass member 144 is elastically supported by the partition member 128. Described more specifically, the elastic body 146 is an inverted truncated-conical member having an upper large-diameter end and a lower small-diameter end. A first connecting member 148 in the form of a metal ring is bonded to the outer circumferential surface of the large-diameter end portion of the elastic body 146, while a second connecting member 150 in the form of a circular metal disc having a relatively large thickness is bonded to the inner circumferential surface of the small-diameter end portion of the elastic body 146. The first connecting member 148 is fixed by the bolts 130 to the radially outer portion of the lower surface of the partition member 128, while the second connecting member 150 is fixed by bolts 152 to a central portion of the upper surface of the mass member 144. Thus, the partition member 128 and the mass member 144 are elastically connected to each other by the elastic body 146. The vibration damper 120 has a vibration system consisting of a mass system consisting of the mass member 144 and the second connecting member 150, and a spring system consisting of the elastic body 146. Preferably, the mass of the mass system and the modulus of elasticity of the spring system are suitably determined so that the natural frequency of the vibration system is substantially equal to the frequency of the vibration of the vibratile member 124 that should be damped.

The partition member 128 and the elastic body 146 cooperate with each other to define a primary fluid chamber 154 filled with the non-compressible fluid. The bottom wall of the partition member 128 separating the auxiliary and primary fluid chambers 138, 154 from each other has an orifice passage 156 formed through a radially outer portion thereof in the circumferential direction over a suitable length. The orifice passage 156 is open at one of its opposite ends to the auxiliary chamber 138 and at the other end to the primary fluid chamber 154, so that the auxiliary and primary fluid chambers 138, 154 are held in communication with each other through the orifice passage, so as to permit the fluid to flow between the two fluid chambers 138, 154 through the orifice passage. The same non-compressible fluid as used in the engine mounts of the first and second embodiments may be used for filling the fluid chambers 138, 154.

When the present active vibration damper 120 is attached to the vibratile member 124 of the automotive vehicle, the connector 142 is connected to the external air conduit 158, which is connected to a switch valve 160 having a first position for communication of the air conduit 158 with the atmosphere, and a second position for communication with a negative pressure source. With the switch valve 160 alternately placed in the first and second positions under the control of a control device 162, the air pressure in the air chamber 136 is periodically changed, that is, raised and lowered. The switch valve 160 is preferably a solenoid-operated switch valve, which is alternately placed in the first and second positions when the solenoid coil is turned on and off according to an electric control pulse signal received from the control device 162. For instance, the switch valve 160 is placed in the first position for the period of rise of each pulse.

In operation of the active vibration damper 120, the switch valve 160 is switched, that is, alternately placed in the first and second positions at a suitable frequency, for exposing the air chamber 136 to the atmospheric pressure and a negative pressure alternately, so as to cause a periodic change of the air pressure in the air chamber 136, which in turn causes oscillation of the rubber plate 132, so that the periodic air pressure change in the air chamber 136 is transmitted to the auxiliary fluid chamber 138 through the oscillation of the rubber plate 132. The periodic fluid pressure change in the auxiliary fluid chamber 138 causes a periodic fluid pressure change in the primary fluid chamber 154 through flows of the fluid through the orifice passage 156 between the two fluid chambers 138, 154. The periodic fluid pressure change in the primary fluid chamber 154 causes elastic deformation of the elastic body 146 with alternate movements of the mass member 144 toward and away from the mounting plate 122, that is, oscillation of the mass member 144. Consequently, an oscillating force generated by the vibration system including the elastic body 146 and the mass member 144 is transmitted from the mounting plate 122 to the vibratile member 124, whereby the vibration of the vibratile member 124 is actively damped.

It will be understood from the foregoing description of the present active vibration damper 120 that the rubber plate 132 serves as an oscillating member which is oscillated so as to cause a periodic change in the fluid pressure in the auxiliary fluid chamber 138, and also serves as an elastic support member for elastically supporting the oscillating member so as to permit oscillation of the oscillating member. It will also be understood that the air chamber 136 and the switch valve 160 for changing the air pressure in the air chamber 136 constitute a major portion of a pneumatic actuator for oscillating the oscillating member in the form of the rubber plate 132.

In the active vibration damper 120, the switching frequency and phase of the switch valve 160 are controlled by the control device 162, depending upon the characteristics of the vibration of the vibratile member 124, so that an oscillating force corresponding to the specific vibration to be damped is applied to the vibratile member 124, so as to provide an active damping effect with respect to the vibration of the vibratile member 124. The frequency and phase of the waveform of the oscillating force (oscillation of the rubber plate 132) can be controlled by controlling the switching frequency and phase of the switch valve 160. Further, the magnitude of the oscillating force can be controlled by controlling the duty ratio of the switch valve 160, that is, a ratio of the time during which the switch valve 160 is placed in the second position for communication of the air chamber 136 with the negative pressure source, to the switching period. Alternatively, the magnitude of the oscillation force can be controlled by controlling the switching period of the switch valve 160 by pulse width modulation.

In the active vibration damper 120, the rubber plate 132 functions as the oscillating member to be oscillated by the pneumatic actuator 136, 160, and is elastically supported through its own elasticity by the mounting member in the form of the mounting plate 122. Thus, the rubber plate 132 functioning as not only the oscillating member but also the elastic support member constitutes a vibration system. The natural frequency fa of this vibration system is set to satisfy the inequality, $(1/\sqrt{2})F<fa<2$ F, by suitably adjusting the mass and the modulus of elasticity of the rubber plate 132 (serving as the mass system and the spring system of the vibration system). In the above inequality, "F" represents a frequency of the vibration of the vibratile member 124. For increasing the freedom of adjustment of the natural frequency fa of the vibration system, it is effective to bond a suitable metal or other material having a high specific gravity to the rubber plate 132. Further, the resonance frequency fb of the fluid flowing through the orifice passage 156 through which the periodic fluid change in the auxiliary fluid chamber 138 that is caused by oscillation of the rubber plate 132 is transmitted to the primary fluid chamber 154 to apply an oscillating force to the vibratile member 124 is determined depending upon the frequency F of the vibration of the vibratile member 124 to be damped, so that the vibration damper 120 provides a sufficiently low dynamic spring constant with respect to the vibration to be damped.

Like the engine mounts of the first and second embodiments, the active vibration damper 120 constructed as described above advantageously provides a high filtering effect to minimize the higher harmonic components, based on the resonance characteristic of the rubber plate 132 functioning as the oscillating member, and based on the fluid flows through the orifice passage 156, even if the higher harmonic components are included in the periodic air pressure change in the air chamber 136 which is induced by the pneumatic actuator including the switch valve 160. The present arrangement is effective to provide a sufficiently large oscillating force at the fundamental frequency, that is, at the frequency of the vibration that should be damped, while reducing the higher harmonic frequency components included in the oscillation of the rubber plate 132 by the periodic air pressure change in the air chamber 136 by the pneumatic actuator, in the periodic fluid pressure change transmitted from the auxiliary fluid chamber 138 to the primary fluid chamber 154, and in the oscillating force to be applied to the vibratile member 124 based on the oscillation of the mass member 144.

Thus, present active vibration damper 120 of the present third embodiment also exhibits a high overall active vibration damping effect with respect to the vibration of the vibratile member 124, by controlling the pneumatic actuator with the control pulse signal, while effectively avoiding deterioration of the vibration of the vibratile member 124 due to the higher harmonic components.

While the presently preferred embodiments of this invention have been described in detail, for illustrative purpose only, it is to be understood that the present invention is not limited to the details of the illustrated embodiments, but may be otherwise embodied.

The principle of the present invention is equally applicable to a cylindrical fluid-filled vibration damping device including an inner shaft member and an outer cylindrical member disposed radially outwardly of the inner shaft member with a suitable radial spacing therebetween, and an elastic body which is interposed between the inner shaft member and the outer cylindrical member so as to elastically connect these members and which partially define a fluid chamber between those members, and wherein the fluid pressure in the fluid chamber is controlled so as to provide an oscillating force in the axial or radial direction for actively damping an input vibration.

Further, the principle of this invention is applicable to not only an engine mount for mounting an engine of an automatic vehicle on the vehicle body in a vibration damping manner, and a damper for damping the vibration of the vehicle body, as described above by way of example, but also other vibration damping devices for automotive vehicles, such as body mounts, differential mounts, suspension bushings and exhaust pipe dampers, and various kinds of vibration damping devices for various devices or equipment other than the automotive vehicles.

It is to be understood that the present invention may be embodied with various other changes, modifications, and improvements, which may occur to those skilled in the art, without departing from the spirit and scope of the invention defining in the following claims.

What is claimed is:

1. A fluid-filled active vibration damping device mounted on a desired object which is subject to a vibration received from a vibration source, for actively damping said vibration, said vibration having a frequency F and including at least one major component of vibration which has a minimum frequency value $F_L$, comprising:

an elastic body which is elastically deformable by the vibration of said desired object and which partially defines a fluid chamber filled with a non-compressible fluid;

an oscillating body which partially defines said fluid chamber;

an elastic support member which elastically supports said oscillating body such that said oscillating body is displaceable;

an actuator for oscillating said oscillating body, so as to control a pressure of said non-compressible fluid in said fluid chamber;

a control device for controlling said actuator by applying thereto a pulse signal whose frequency corresponds to said frequency F of said vibration received from said vibration source; and said oscillating body having a natural frequency fa satisfying an inequality, $(1/\sqrt{2})F_L < fa < 2\ F_L$.

2. A fluid-filled active vibration damping device according to claim 1, wherein said actuator includes electromagnetic drive means intermittently energized according to said pulse signal received from said control device, for generating an electromagnetic force for oscillating said oscillating body.

3. A fluid-filled active vibration damping device according to claim 1, wherein said oscillating body partially defines an air chamber, and said actuator includes a switch valve which is alternately switched between two positions according to said pulse signal received from said control device, for alternately applying an atmospheric pressure and a negative pressure to said air chamber.

4. A fluid-filled active vibration damping device according to claim 1, wherein said natural frequency fa of said oscillating body satisfies a formula $fa \leq 1.8\ F_L$.

5. A fluid-filled active vibration damping device according to claim 4, wherein said natural frequency fa of said oscillating body satisfies a formula $F_L \leq fa \leq (\sqrt{2})F_L$.

6. A fluid-filled active vibration damping device according to claim 1, wherein said fluid chamber includes a primary chamber in which the pressure of said non-compressible fluid is changed when said elastic body is elastically deformed, and an auxiliary chamber in which the pressure of said non-compressible fluid is changed when said oscillating member is oscillated, said fluid-filled active vibration damping device further comprising means for defining a first orifice for fluid communication between said primary and auxiliary chambers, and wherein said first orifice is formed such that a resonance frequency fb of said non-compressible fluid flowing through said first orifice corresponds to said frequency $F_L$ of said vibration of said desired object, and is not higher than said resonance frequency fa of said oscillating body.

7. A fluid-filled active vibration damping device according to claim 6, further comprising a partition member cooperating with said oscillating body to define said auxiliary fluid chamber, and further cooperating with said elastic body to define said primary fluid chamber, and wherein said partition member has said first orifice.

8. A fluid-filled active vibration damping device according to claim 1, further comprising a flexible diaphragm which partially defines an equilibrium chamber filled with a non-compressible fluid, and means for defining a second orifice for fluid communication between said equilibrium chamber and said fluid chamber, and wherein said second orifice is formed such that a resonance frequency fc of said non-compressible fluid flowing through said second orifice is lower than said frequency $F_L$ of the vibration of said desired object.

9. A fluid-filled active vibration damping device according to claim 1, further comprising a first mounting member and a second mounting member which are elastically connected to each other by said elastic body, and wherein said oscillating body is elastically supported by said second mounting member through said elastic support member, and said actuator includes drive means for oscillating said oscillating body, said drive means being supported by said second mounting member, and one of said first and second mounting members being fixed to said desired object.

10. A fluid-filled active vibration damping device according to claim 9, wherein said oscillating body consists of a hard member elastically supported by said second mounting member through said elastic support member.

11. A fluid-filled active vibration damping device according to claim 10, wherein said fluid chamber includes a primary chamber in which the pressure of said non-compressible fluid is changed when said elastic body is elastically deformed, and an auxiliary chamber in which the pressure of the non-compressible fluid is changed when said oscillating member is oscillated, said fluid-filled active vibration damping device further comprising a partition member which cooperates with said hard member and said elastic support member to define said auxiliary chamber, said partition member further cooperating with at least said elastic body to define said primary chamber.

12. A fluid-filled active vibration damping device according to claim 9, wherein said oscillating body and said elastic support member consist of respective inner and outer portions of a rubber plate.

13. A fluid-filled active vibration damping device according to claim 12, wherein said rubber plate partially defines an air chamber and said fluid chamber on opposite sides thereof, said actuator has said air chamber, and a switch valve for alternate communication of said air chamber to an atmosphere and a negative pressure source, to oscillate said rubber plate.

14. A fluid-filled active vibration damping device according to claim 13, wherein said first mounting member cooperates with said rubber plate to define said air chamber.

15. A fluid-filled active vibration damping device according to claim 9, wherein the other of said first and second mounting members is fixed to said vibration source.

16. A fluid-filled active vibration damping device according to claim 9, wherein the other of said first and second mounting member functions as a mass which cooperates with said elastic body to constitute a vibration system.

17. A combination of a fluid-filled active vibration damping device and a desired object mounted on said vibration damping device for actively damping a vibration which is received by said desired object from a vibration source, and vibration having a frequency F and including at least one major component of vibration which has a minimum frequency value $F_L$, said vibration damping device comprising:

an elastic body which is elastically deformable by the vibration of said desired object and which partially defines a fluid chamber filled with a non-compressible fluid;

an oscillating body which partially defines said fluid chamber;

an elastic support member which elastically supports said oscillating body such that said oscillating body is displaceable;

an actuator for oscillating said oscillating body, so as to control a pressure of said non-compressible fluid in said fluid chamber;

a control device for controlling said actuator by applying thereto a pulse signal whose frequency corresponds to said frequency F of said vibration received from said vibration source; and said oscillating body having a natural frequency fa satisfying an inequality, $(1/\sqrt{2})F_L < fa < 2 F_L$.

18. A fluid-filled active vibration damping device mounted between an engine and a body of an automotive vehicle, for actively damping an engine idling vibration generated by said engine during an operation of said engine at an idling speed thereof, said engine idling vibration including a major component of vibration having a frequency F, comprising:

an elastic body which is elastically deformable by the vibration of said body of the automotive vehicle and which partially defines a fluid chamber filled with a non-compressible fluid;

an oscillating body which partially defines said fluid chamber;

an elastic support member which elastically supports said oscillating body such that said oscillating body is displaceable;

an actuator for oscillating said oscillating body, so as to control a pressure of said non-compressible fluid in said fluid chamber;

a control device for controlling said actuator by applying thereto a pulse signal whose frequency corresponds to said frequency F of said major component of said engine idling vibration to be damped; and said oscillating body having a natural frequency fa satisfying an inequality, $(1/\sqrt{2})F < fa < 2 F$.

* * * * *